(12) United States Patent
Nicholls et al.

(10) Patent No.: US 9,171,568 B1
(45) Date of Patent: Oct. 27, 2015

(54) DATA STORAGE DEVICE PERIODICALLY RE-INITIALIZING SPINDLE MOTOR COMMUTATION SEQUENCE BASED ON TIMING DATA

(71) Applicant: Western Digital Technologies, Inc., Irvine, CA (US)

(72) Inventors: Michael T. Nicholls, Laguna Hills, CA (US); Philip Tin Yue Ng, Anaheim, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/315,143

(22) Filed: Jun. 25, 2014

(51) Int. Cl.
*G11B 19/28* (2006.01)
*H02P 6/16* (2006.01)

(52) U.S. Cl.
CPC . *G11B 19/28* (2013.01); *H02P 6/16* (2013.01)

(58) Field of Classification Search
None
See application file for complete search history.

(56) References Cited

U.S. PATENT DOCUMENTS

| | | | |
|---|---|---|---|
| 5,038,232 A * | 8/1991 | Grace | 360/73.03 |
| 5,260,631 A | 11/1993 | Hayashida et al. | |
| 5,276,569 A * | 1/1994 | Even | 360/73.03 |
| 5,311,376 A * | 5/1994 | Joan et al. | 360/51 |
| 5,471,353 A | 11/1995 | Codilian et al. | |
| 5,491,395 A * | 2/1996 | Hutsell et al. | 360/69 |
| 5,594,600 A * | 1/1997 | Bruner et al. | 360/69 |
| 5,633,570 A * | 5/1997 | Motzko | 360/73.03 |
| 5,898,283 A | 4/1999 | Bennett | |
| 5,914,828 A * | 6/1999 | Bruner et al. | 360/69 |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,104,565 A * | 8/2000 | Bruner et al. | 360/69 |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,279,108 B1 * | 8/2001 | Squires et al. | 712/244 |
| 6,281,652 B1 | 8/2001 | Ryan et al. | |
| 6,285,521 B1 | 9/2001 | Hussein | |
| 6,292,320 B1 | 9/2001 | Mason et al. | |
| 6,310,742 B1 | 10/2001 | Nazarian et al. | |
| 6,320,718 B1 | 11/2001 | Bouwkamp et al. | |
| 6,342,984 B1 | 1/2002 | Hussein et al. | |
| 6,347,018 B1 | 2/2002 | Kadlec et al. | |
| 6,369,972 B1 | 4/2002 | Codilian et al. | |
| 6,369,974 B1 | 4/2002 | Asgari et al. | |
| 6,462,896 B1 | 10/2002 | Codilian et al. | |
| 6,476,996 B1 | 11/2002 | Ryan | |
| 6,484,577 B1 | 11/2002 | Bennett | |

(Continued)

*Primary Examiner* — Wayne Young
*Assistant Examiner* — James L Habermehl

(57) ABSTRACT

A data storage device is disclosed comprising a disk comprising timing data, a spindle motor configured to rotate the disk, wherein the spindle motor comprises a plurality of windings, and a head actuated over the disk. A phase of a commutation controller is initialized based on the timing data on the disk, and a commutation sequence of the commutation controller is driven based on the timing data on the disk, wherein the commutation controller is configured to commutate the windings based on the commutation sequence. The phase of the commutation controller is re-initialized based on the timing data on the disk, thereby compensating for a cumulative phase error when driving the commutation sequence based on the timing data on the disk.

20 Claims, 3 Drawing Sheets

(56) References Cited

U.S. PATENT DOCUMENTS

| | | |
|---|---|---|
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,753,667 B2 | 6/2004 | Sakamoto |
| 6,754,025 B1 | 6/2004 | Shepherd et al. |
| 6,760,186 B1 | 7/2004 | Codilian et al. |
| 6,788,483 B1 | 9/2004 | Ferris et al. |
| 6,791,782 B1 | 9/2004 | Codilian et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,075,746 B1 | 7/2006 | Kupferman |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,776 B1 | 10/2006 | Warren, Jr. et al. |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,496 B1 * | 5/2007 | Kupferman et al. ............ 360/51 |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |

(56) References Cited

U.S. PATENT DOCUMENTS

| | | |
|---|---|---|
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 2006/0055353 A1 | 3/2006 | Van As et al. |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

\* cited by examiner

DATA STORAGE DEVICE PERIODICALLY RE-INITIALIZING SPINDLE MOTOR COMMUTATION SEQUENCE BASED ON TIMING DATA

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

The disk 2 is typically rotated by a spindle motor at a high speed so that an air bearing forms between the head and the disk surface. A commutation controller applies a driving signal to the windings of the spindle motor using a particular commutation sequence in order to generate a rotating magnetic field that causes the spindle motor to rotate. Prior art disk drives have typically controlled the commutation of the windings by measuring a zero-crossing frequency of a back electromotive force (BEMF) voltage generated by the windings of the spindle motor. The driving signals applied to the windings of the spindle motor are typically disabled during a BEMF detection window so that the BEMF zero-crossing may be accurately detected. However, disabling the driving signals typically induces current transients in the windings of the spindle motor, which can result in acoustic noise, torque/speed jitter, and disk vibration.

DETAILED DESCRIPTION

Figure 1:
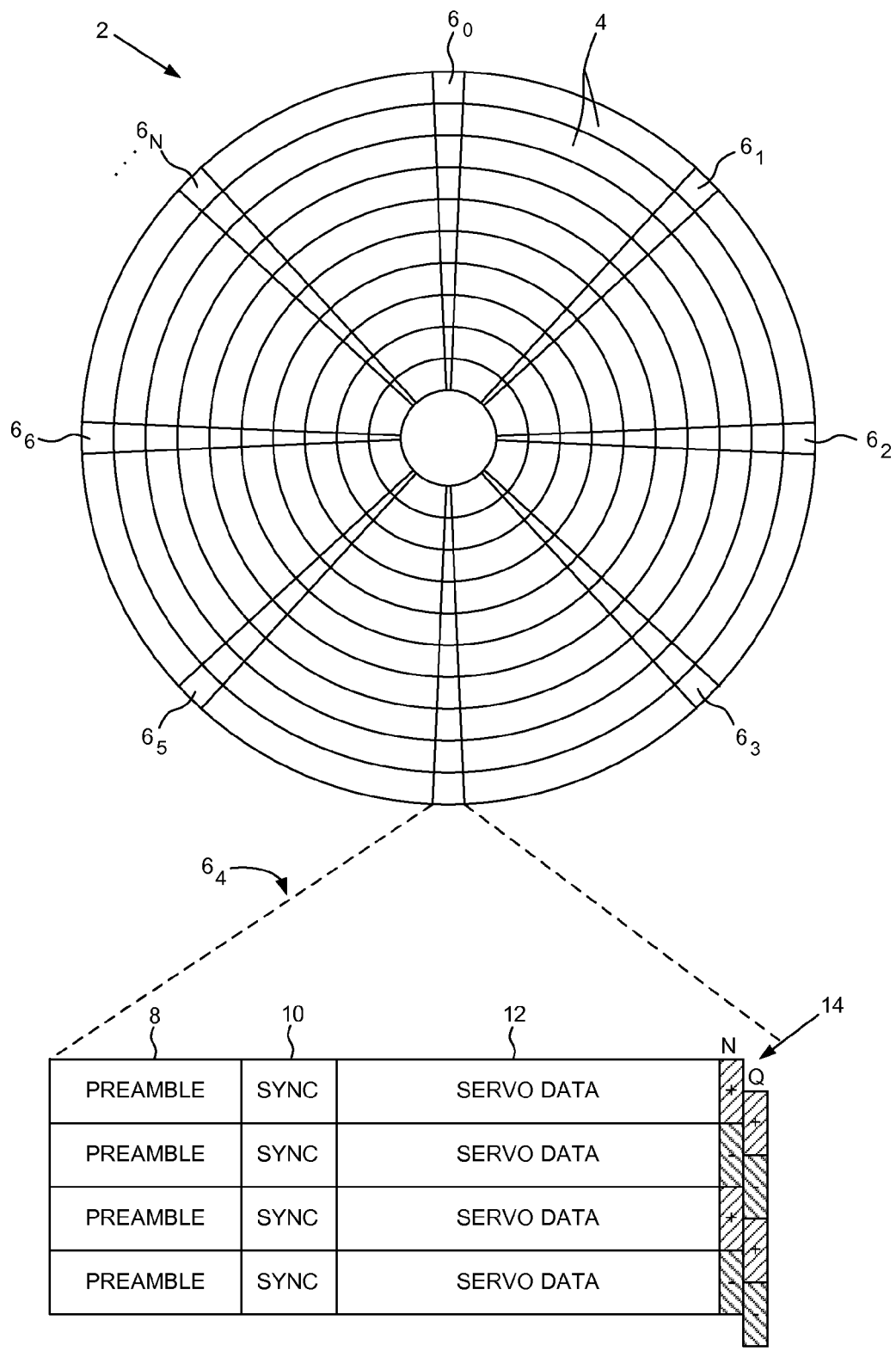
FIG. 1 shows a prior art disk format comprising a plurality of servo tracks defined by servo sectors.
Figure 2:
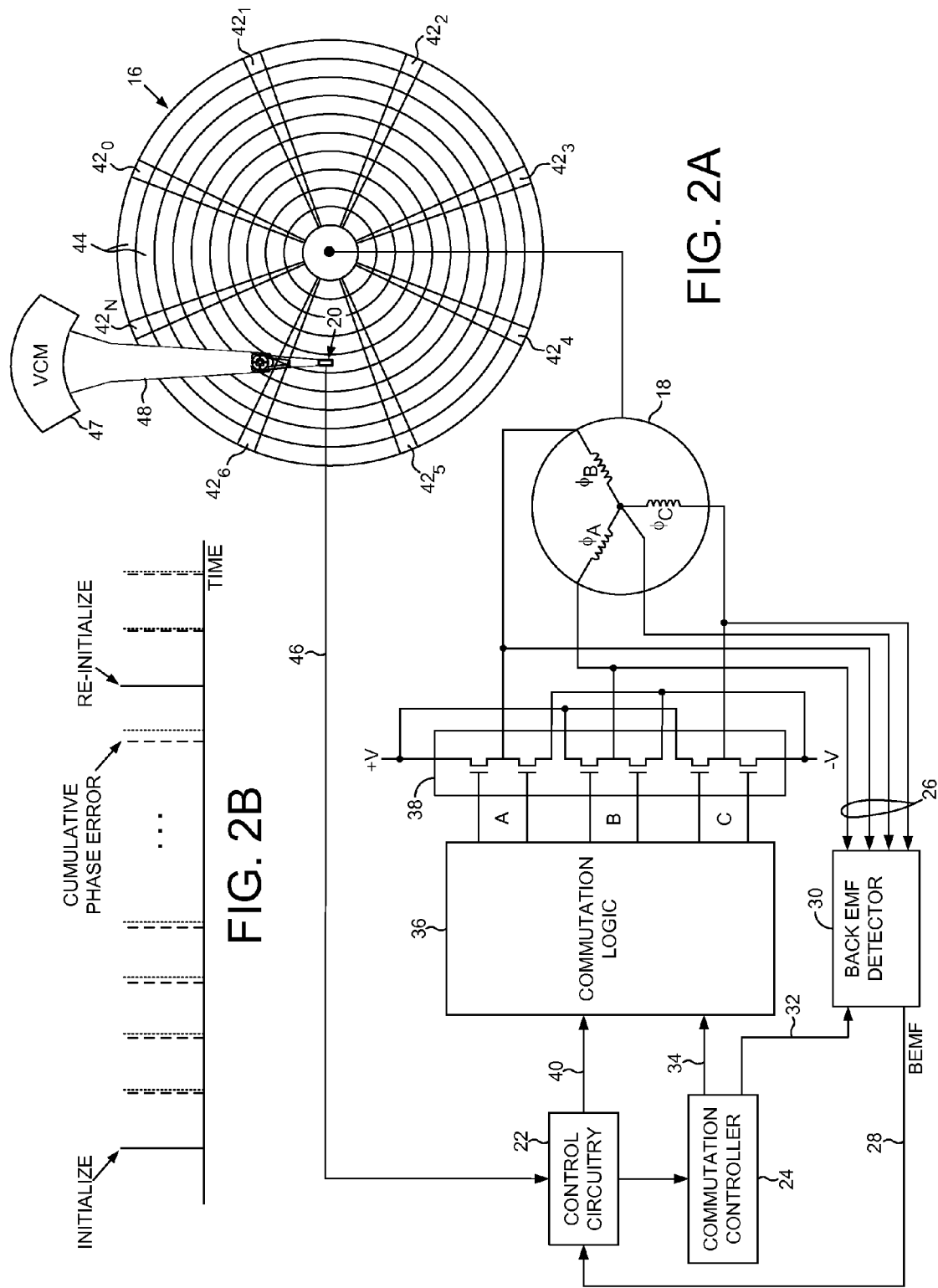
FIG. 2A shows a data storage device in the form of a disk drive according to an embodiment comprising a head actuated over a disk, and a spindle motor configured to rotate the disk.
FIG. 2B illustrates an embodiment wherein a phase of a commutation controller is periodically re-initialized to compensate for a cumulative phase error.

FIG. 2A shows a data storage device in the form of a disk drive according to an embodiment comprising a disk 16 comprising timing data, a spindle motor 18 configured to rotate the disk 16, wherein the spindle motor 18 comprises a plurality of windings, and a head 20 actuated over the disk 16. The disk drive further comprises control circuitry 22 configured to initialize a phase of a commutation controller 24 based on the timing data on the disk 16, and drive a commutation sequence of the commutation controller 24 based on the timing data on the disk 16, wherein the commutation controller 24 is configured to commutate the windings based on the commutation sequence. The control circuitry 22 re-initializes the phase of the commutation controller based on the timing data on the disk 16, thereby compensating for a cumulative phase error when driving the commutation sequence based on the timing data on the disk.

In one embodiment such as shown in FIG. 2A, a back electromotive force (BEMF) voltage 26 generated by the windings of the spindle motor 18 is processed in order to drive the commutation sequence of the commutation controller 24. For example, while the disk is being spun up and/or when synchronizing to the timing data on the disk 16 is lost, the control circuitry 22 may process a BEMF signal 28 which may be a square wave representing the BEMF zero-crossings as detected by a BEMF detector 30. The commutation controller 24 may generate a control signal 32 which configures the BEMF detector 30 to detect the zero-crossing of the BEMF voltage generated by each winding as the disk rotates. The commutation controller 24 also generates a control signal 34 applied to commutation logic 36. In the embodiment of FIG. 2A, the commutation logic 36 is configured by the control signal 34 to control the state of switches 38 in order to drive the windings with driving voltages +V and −V. The commutation logic 36 may operate in any suitable manner, such as by driving the switches 38 as linear amplifiers that apply continuous-time sinusoidal voltages to the windings. In another embodiment, the commutation logic 36 may drive the switches 38 using pulse wide modulation (PWM), such as using square wave PWM, trapezoidal PWM, or sinusoidal PWM. Regardless as to how the windings are driven, the commutation controller 24 generates the control signal 34 so that the windings are commutated at the correct periods, thereby generating the desired rotating magnetic field that causes the spindle motor to rotate. In one embodiment, the control circuitry 22 may generate a control signal 40 that controls the effective amplitude of the driving voltages (continuous or PWM), thereby controlling the speed of the spindle motor.

In one embodiment, the commutation controller 24 may disable the driving voltage applied to the winding that the BEMF detector 30 is evaluating for a zero-crossing during a zero-crossing window. However, disabling the driving voltage typically induces current transients in the windings of the spindle motor, which can result in acoustic noise, torque/speed jitter, and disk vibration. Accordingly, in one embodiment after the disk 16 has spun up to a target operating speed and the control circuitry 22 has synchronized to the timing data on the disk 16, the control circuitry 22 switches from using the BEMF signal 28 to using the timing data on the disk 16 to drive the commutation sequence. If synchronization to the timing data is lost for any reason, the control circuitry 22 may switch back to using the BEMF signal 28 to drive the commutation sequence.

The disk 16 may comprise any suitable timing data used to drive the commutation sequence of the spindle motor, wherein in the embodiment of FIG. 2A, the timing data on the disk 16 may comprise servo sectors $42_0$-$42_N$ that define a plurality of servo tracks 44. The control circuitry 22 processes a read signal 46 emanating from the head 20 to demodulate the servo sectors $42_0$-$42_N$ and generate a position error signal (PES) representing an error between the actual position of the head and a target position relative to a target track. The control circuitry 22 filters the PES using a suitable compensation filter to generate a control signal applied to a voice coil motor (VCM) 47 which rotates an actuator arm 48 about a pivot in order to actuate the head 20 radially over the disk 16 in a direction that reduces the PES. The servo sectors $42_0$-$42_N$ may comprise any suitable head position information, such as a track address for coarse positioning and servo bursts for fine positioning. The servo bursts may comprise any suitable pattern, such as an amplitude based servo pattern or a phase based servo pattern.

In one embodiment, the rotation phase of the disk may be determined by reading a wedge number from each servo sector (where the wedge numbers may range from 0-N as shown in FIG. 2A). Accordingly, in one embodiment the phase of the commutation controller 24 may be initialized based on the current wedge number being read by the head 20. After initializing the phase of the commutation controller 24, the control circuitry 22 may measure a rotation speed of the disk 16 by reading the servo sectors which may be converted into an oscillating frequency for driving the frequency of the commutation sequence. However, the error in measuring the rotational velocity of the disk may induce a phase error in the commutation sequence. Over time, this measurement error will cause the phase error to accumulate as illustrated in FIG. 2B. Accordingly, in one embodiment the control circuitry 22 re-initializes the phase of the commutation controller 24 in order to compensate for the cumulative phase error such as illustrated in FIG. 2B.

Figure 3:
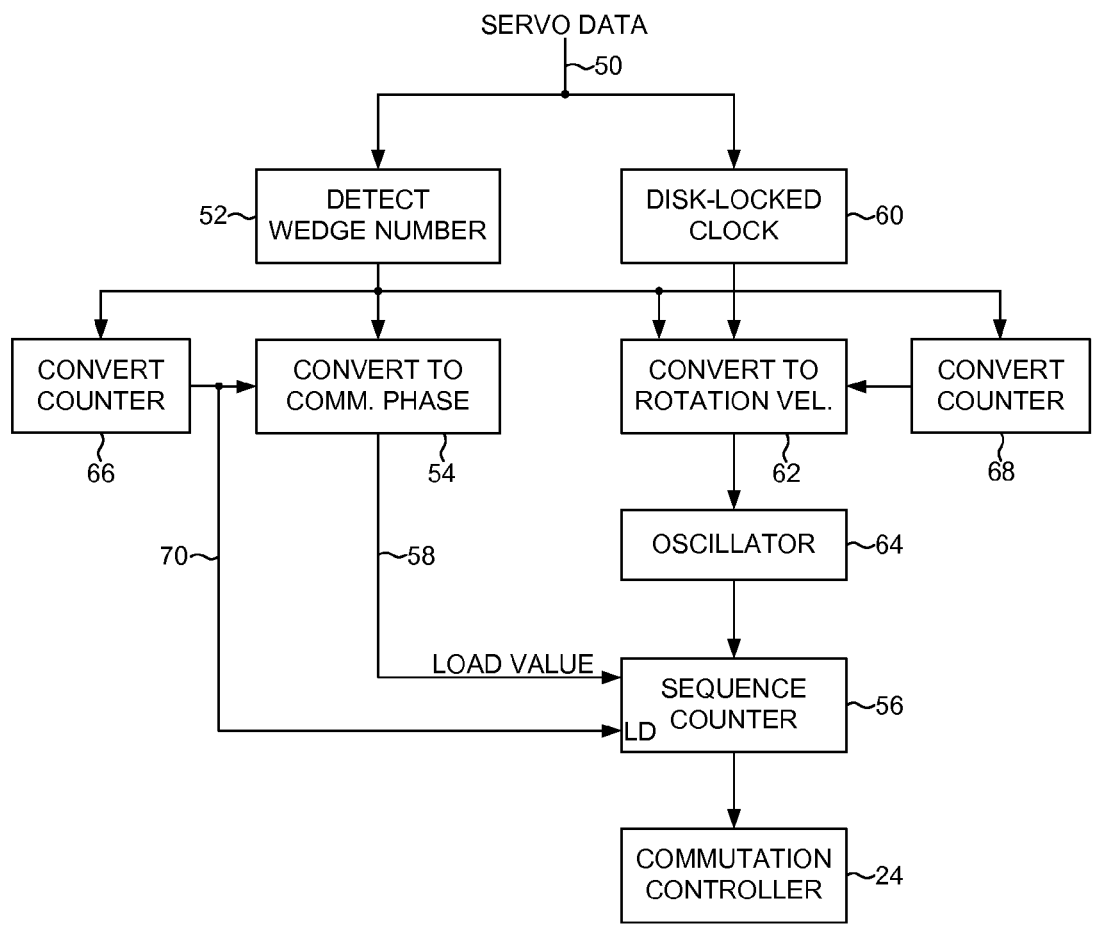
FIG. 3 shows control circuitry according to an embodiment wherein a wedge number is used to initialize and re-initialize the phase of the commutation controller, and a disk locked clock is used to measure a rotational velocity of the disk which adjusts a frequency of an oscillator for driving the commutation sequence.

FIG. 3 shows control circuitry according to an embodiment wherein the servo data 50 read from the disk 16 is processed at block 52 to detect the wedge number of the current servo sector. Block 54 converts the detected wedge number into a phase of the commutation controller 24 which is loaded into a counter 56 over line 58. The servo data 50 is also processed at block 60 to synchronize a disk locked clock to a rotation frequency of the disk 16 using any suitable technique (e.g., using a phase-locked loop). The disk locked clock is converted at block 62 into a measured rotational velocity of the disk 16. The measured rotational velocity adjusts the frequency of an oscillator 64 which cycles the counter 56 such that the output of the counter 56 represents the phase and frequency of the commutation sequence for the commutation controller 24. In one embodiment, the counter 56 is a modulo-N counter (where N+1 represents the number of states of the commutation sequence) so that the counter 56 continuously cycles from 0 to N as the commutation sequence is repeated.

In one embodiment, each time a new servo sector is detected (wedge number is detected at block 52), a first conversion counter 66 is incremented and a second conversion counter 68 is incremented. When the second conversion counter 68 reaches a predetermined threshold, the disk locked clock generated at block 60 is converted at block 62 into the measured rotation velocity of the disk, thereby updating the control signal applied to the oscillator 64. Accordingly in this embodiment, the rotational velocity of the disk is measured periodically as determined by the period of the second conversion counter 68.

When the first conversion counter 66 reaches a predetermined threshold, the wedge number detected at block 52 is converted into a phase at block 54 which is used to re-initialize the phase of the commutation controller 24 by loading the phase value into the counter 56 via the control line 70. Accordingly in this embodiment, the phase of the commutation controller is periodically re-initialized as determined by the period of the first conversion counter 66 in order to periodically compensate for the cumulative phase error such as shown in the example of FIG. 2B. In one embodiment, the first and second conversion counters 66 and 68 may operate based on different periods such that the detected wedge number may be converted into the phase more or less frequently than the disk locked clock is converted into the measured rotational velocity of the disk.

Figure 4:
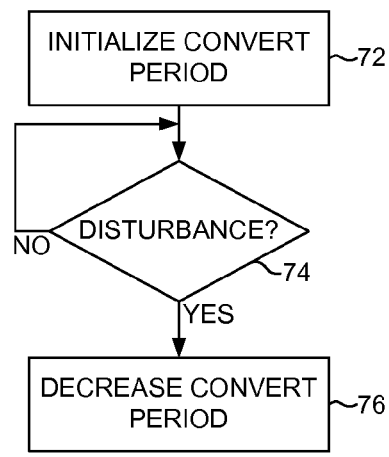
FIG. 4 is a flow diagram according to an embodiment wherein when a disturbance is detected, a conversion period is decreased, wherein the conversion period for re-initializing at least one of the phase of the commutation sequence and/or a period for measuring a rotation velocity of the disk.

In one embodiment the period of one or both of the conversion counters 66 and 68 may be adjusted based on any suitable event. For example, when a disturbance is affecting the disk drive (e.g., an external vibration), it may cause the rotation speed of the spindle motor to deviate (e.g., oscillate). Therefore in an embodiment illustrated in the flow diagram of FIG. 4, if after initializing the period of the conversion counters (block 72) a disturbance is detected (block 74), a period of at least one of the conversion counters 66 and 68 may be decreased (block 76) so that the conversion occurs more frequently. This embodiment may help compensate for the deviations in rotation speed of the spindle motor by limiting the cumulative phase error of the commutation sequence and/or by limiting a frequency error of the commutation sequence. The disturbance affecting the disk drive may be detected at block 74 using any suitable technique, such as by monitoring a suitable disturbance sensor (e.g., accelerometer), by monitoring the PES of the servo system that controls the radial location of the head 20 over the disk 16, by monitoring the wedge-to-wedge time of the servo sectors, and/or by monitoring a frequency of a clock locked to a rotation frequency of the disk (disk locked clock), etc.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
    a disk comprising timing data;
    a spindle motor configured to rotate the disk, wherein the spindle motor comprises a plurality of windings;
    a head actuated over the disk; and
    control circuitry configured to:
        initialize a phase of a commutation controller based on the timing data on the disk;
        drive a commutation sequence of the commutation controller based on the timing data on the disk, wherein the commutation controller is configured to commutate the windings based on the commutation sequence; and
        re-initialize the phase of the commutation controller based on the timing data on the disk, thereby compensating for a cumulative phase error when driving the commutation sequence based on the timing data on the disk.

2. The data storage device as recited in claim 1, wherein the timing data comprises servo sectors on the disk.

3. The data storage device as recited in claim 1, wherein control circuitry is further configured to re-initialize the phase of the commutation controller N times over a single revolution of the disk, where N is an integer greater than zero.

4. The data storage device as recited in claim 1, wherein the control circuitry is further configured to:
    synchronize a disk locked clock to a rotation frequency of the disk based on the timing data on the disk;
    measure a rotational velocity of the disk based on the disk locked clock;
    adjust a frequency of an oscillator based on the measured rotational velocity of the disk; and
    drive the commutation sequence based on the oscillator.

5. The data storage device as recited in claim 4, wherein the control circuitry is further configured to:
    cycle a counter based on the oscillator; and
    drive the commutation sequence based on the counter.

6. The data storage device as recited in claim 5, wherein the control circuitry is further configured to initialize the phase of the commutation controller by loading the counter with an initial value.

7. The data storage device as recited in claim 5, wherein the control circuitry is further configured to re-initialize the phase of the commutation controller by adjusting the counter.

8. The data storage device as recited in claim 4, wherein the control circuitry is further configured to periodically measure the rotational velocity of the disk based on the disk locked clock.

9. The data storage device as recited in claim 8, wherein the control circuitry is further configured to:
    detect a disturbance affecting the data storage device; and
    when the disturbance is detected, decrease the period that the rotational velocity of the disk is measured.

10. The data storage device as recited in claim 1, wherein the control circuitry is further configured to:
    periodically re-initialize the phase of the commutation controller based on the timing data on the disk;
    detect a disturbance affecting the data storage device; and
    when the disturbance is detected, decrease the period that the phase of the commutation controller is re-initialized.

11. A method of operating a data storage device, the method comprising:
    initializing a phase of a commutation controller based on the timing data on the disk;
    driving a commutation sequence of the commutation controller based on the timing data on the disk, wherein the commutation controller is configured to commutate the windings based on the commutation sequence; and
    re-initializing the phase of the commutation controller based on the timing data on the disk, thereby compensating for a cumulative phase error when driving the commutation sequence based on the timing data on the disk.

12. The method as recited in claim 11, wherein the timing data comprises servo sectors on the disk.

13. The method as recited in claim 11, further comprising re-initializing the phase of the commutation controller N times over a single revolution of the disk, where N is an integer greater than zero.

14. The method as recited in claim 11, further comprising:
synchronizing a disk locked clock to a rotation frequency of the disk based on the timing data on the disk;
measuring a rotational velocity of the disk based on the disk locked clock;
adjusting a frequency of an oscillator based on the measured rotational velocity of the disk; and
driving the commutation sequence based on the oscillator.

15. The method as recited in claim 14, further comprising:
cycling a counter based on the oscillator; and
driving the commutation sequence based on the counter.

16. The method as recited in claim 15, further comprising initializing the phase of the commutation controller by loading the counter with an initial value.

17. The method as recited in claim 15, further comprising re-initializing the phase of the commutation controller by adjusting the counter.

18. The method as recited in claim 14, further comprising periodically measuring the rotational velocity of the disk based on the disk locked clock.

19. The method as recited in claim 18, further comprising:
detecting a disturbance affecting the data storage device; and
when the disturbance is detected, decreasing the period that the rotational velocity of the disk is measured.

20. The method as recited in claim 11, further comprising:
periodically re-initializing the phase of the commutation controller based on the timing data on the disk;
detecting a disturbance affecting the data storage device; and
when the disturbance is detected, decreasing the period that the phase of the commutation controller is re-initialized.

* * * * *